United States Patent [19]
Refait

[11] Patent Number: 5,513,992
[45] Date of Patent: May 7, 1996

US005513992A

[54] APPARATUS FOR SIMULATING PHYSIOLOGICAL AND PHYSIOPATHOLOGICAL CONDITIONS

[76] Inventor: Denis Refait, 5 Rue Péguy, 75006 Paris, France

[21] Appl. No.: 284,696

[22] PCT Filed: Feb. 17, 1993

[86] PCT No.: PCT/FR93/00155

§ 371 Date: Aug. 12, 1994

§ 102(e) Date: Aug. 12, 1994

[87] PCT Pub. No.: WO93/17409

PCT Pub. Date: Sep. 2, 1993

[30] Foreign Application Priority Data

Feb. 21, 1992 [FR] France .................... 92 02004

[51] Int. Cl.$^6$ ................................. G09B 23/30
[52] U.S. Cl. .................. 434/267; 434/262; 434/270
[58] Field of Search ...................... 434/262, 267, 434/270, 271

[56] References Cited

U.S. PATENT DOCUMENTS

| | | | |
|---|---|---|---|
| 3,947,974 | 4/1976 | Gordon et al. | |
| 4,750,888 | 6/1988 | Allard et al. | 434/69 |
| 4,881,088 | 11/1989 | Fisher, Jr. et al. | 346/140 R |
| 5,275,572 | 1/1994 | Ungs et al. | 434/262 |
| 5,397,237 | 3/1995 | Dhont et al. | 434/262 |

FOREIGN PATENT DOCUMENTS

| | | |
|---|---|---|
| 0319623 | 6/1989 | European Pat. Off. . |
| 2594247 | 8/1987 | France . |
| 3900006 | 8/1990 | Germany . |
| WO9004244 | 4/1990 | WIPO . |
| WO9005971 | 5/1990 | WIPO . |
| WO9106935 | 5/1991 | WIPO . |

OTHER PUBLICATIONS

SU 1298–795–A (Russian Abstract), Nov. 26, 1985 "Training Aid for Inserting Needle into Carotid Artery".

*Primary Examiner*—John S. Hilten
*Attorney, Agent, or Firm*—Loeb & Loeb

[57] ABSTRACT

The apparatus includes a probe that has an area of linear contact with the skin of a mannequin along a longitudinal axis. The mannequin includes means for activation of a group of at least two sensors by the probe. The invention provides for at least two probe orientations. The apparatus further allows one to visualize deep organs with images of real clinical cases that are stored in a audio-visual memory.

16 Claims, 2 Drawing Sheets

APPARATUS FOR SIMULATING PHYSIOLOGICAL AND PHYSIOPATHOLOGICAL CONDITIONS

The invention concerns apparatus for simulating physiological and physiopathological conditions and intended to be used for training medical personnel.

More particularly, the apparatus is intended for teaching techniques for ultrasound scanning deep organs using scanning means usually called a probe adapted to emit a signal and to receive a signal reflected from a target organ; this can be an ultrasound probe for ultrasound and/or Doppler symptomatology, in particular vascular symptomatology. The scanning means can instead be a sensor adapted to pick up a signal emitted by the target organ in response to appropriate stimulation, either physical (electromagnetic waves) or chemical (radioactive tracers).

Document U.S. Pat. No. 3,947,974 describes apparatus for simulating cardio-vascular conditions. The apparatus comprises a mannikin which represents the patient to be examined, an audio system which holds in memory sounds corresponding to given pathological conditions and a stethoscope simulator enabling a trainee to interact with the mannikin as he or she would with a patient.

The mannikin has an outer layer of material imitating the texture of skin, under which switches are laid out at predetermined locations where the trainee is supposed to position the chestpiece of a stethoscope to listen to the beating of the heart of a patient.

The audio system includes a magnetic tape. Each switch is associated with a track on the magnetic tape on which are recorded the sounds that the trainee would hear on placing the stethoscope at the same point on a patient.

The stethoscope simulator is connected to the audio system so that the playback from a track on the tape delivers the sound to the earpieces.

The chestpiece of the stethoscope simulator incorporates a magnet. When the chestpiece is placed on the mannikin at one of the points where there is a switch the latter is closed by the magnetic field. The corresponding sounds are then delivered to the earpieces.

The apparatus further includes mechanical means for simulating respiratory movements, for example, which can indicate to the trainee where to place the stethoscope.

Attempts have been made to produce apparatus for simulating ultrasound examination, possibly in combination with Doppler vascular examination (these two examinations are often carried out at the same time as they yield complementary results).

The ultrasound imaging technique relies on the reflection of ultrasound by organs. Echography scans can show an organ at a greater or lesser depth in a non-bony region. An image representing the organ at a given time is displayed on a monitor. A sequence of images is displayed to examine the behavior of the organ over a given period.

The Doppler effect is used to measure the speed at which blood flows in the blood vessels. The monitor displays a spot tracing a curve representing this speed and at the same time a sound is heard corresponding to the flow of blood at a given point of the blood vessel.

Known simulation apparatus, of the type described above, is not capable of adequate performance given the accuracy requirements of ultrasound and Doppler scanning techniques.

The position of the scanning probe and its orientation in space are of critical importance for directing the ultrasound beam towards the part of the organ to be scanned. It will be readily understood that a slight difference in the inclination of the probe produces an image of a different part of the organ.

It is therefore important for the trainee to learn not only where to place the probe but also how to orient it correctly in space to scan the organ at the required angle.

The prior art devices are inadequate in that they give only a coarse detection of the position of the scanning means.

The present invention proposes apparatus which meets applicable accuracy requirements.

It proposes medical simulation apparatus of the kind comprising a mannikin representing all or part of a human body, said mannikin including a plurality of sensors, at least one means for generating signals representative of a given physiological or physiopathological condition under the control of a system unit, the signal generator means being adapted to be activated by scanning means for scanning said mannikin, characterized in that said scanning means is a probe adapted to cooperate with at least one group of at least two sensors adapted to define a position and an orientation of the probe at a specific position on said mannikin.

The sensors are organized in an array in groups of at least two.

The probe includes a linear area of contact with the skin of the mannikin and a longitudinal axis. Means adapted to activate a group of at least two sensors are disposed in this linear area.

The invention distinguishes a probe orientation in elevation, defined by the angle between the longitudinal axis of the probe and its projection on the plane of the mannikin, and an orientation in azimuth, defined by the angle between the line of contact and a reference direction.

In one embodiment of the invention the sensors are active only when the probe is not only facing at least two sensors but also oriented perpendicular (for example) to the surface of the outer layer of the mannikin in the area scanned.

The sensors are judiciously disposed in the region of the organ to be scanned according to the areas of the organ to be examined, as in real life.

By virtue of these arrangements a trainee can be taught to place the probe in such a way as to achieve an appropriate orientation of the ultrasound beam. To teach the trainee even better how to position the probe accurately according to the image of the organ required it is possible to use three sensors in an appropriate spatial arrangement rather than two sensors.

In accordance with the invention there is associated with each group of at least two sensors a set of signals representative of a given physiological or physiopathological condition.

These signals correspond to audiovisual data stored in memory means.

The system unit is adapted to receive the signals emitted by groups of sensors when they are stimulated by the probe and to determine their origin in order to command the playback from the memory means of the respective audiovisual data and to command their display on a TV monitor.

The apparatus optionally includes means for selecting at any time a scanning mode corresponding to ultrasound examination or Doppler examination, for example, with the result that, for the same position and orientation of the probe, the system unit is adapted to select for display stored data corresponding to the selected mode.

The present invention will be more clearly understood from the following description given by way of example only and with reference to the appended drawings in which.

Figure 1:
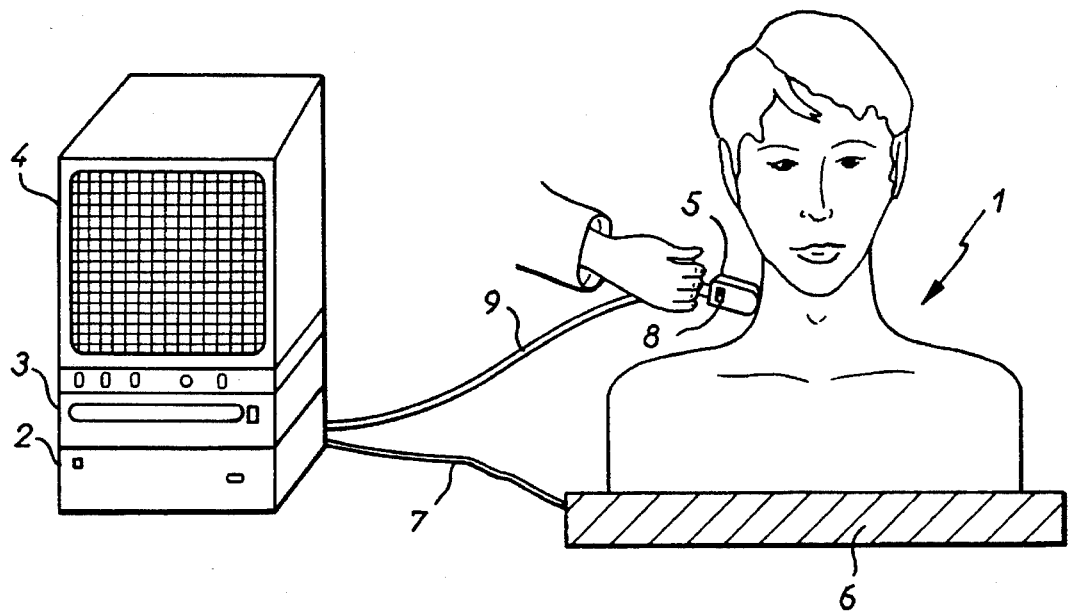
FIG. 1 is a diagram showing apparatus in accordance with the invention designed to simulate ultrasound and/or Doppler examination of the carotid artery.

In the selected embodiment shown in FIG. 1 the apparatus includes a mannikin 1, a video disk or CD-I player 3, a TV monitor 4 and a scanning probe 5, all connected to a system unit 2.

The mannikin 1 reproduces the upper thorax and the head of a patient. It rests on a rigid support 6 and is covered with an outer layer of flexible and elastic material. Magnetoresistive type sensors are disposed under the outer layer of the mannikin in the part of the neck where the right and left carotid arteries are supposedly located. Their disposition is described below. Mechanical means (not shown) are also arranged under the outer layer to simulate the pulsing of each artery.

The mannikin 1 is connected to the system unit 2 by a cable 7 through which the stimulated sensors transmit signals to the system unit and through which the system unit 2 controls the movement of the mechanical means.

The probe 5 contains a magnet adapted to activate the sensors of the mannikin along a linear area of contact with the skin of the mannikin. The manner in which the probe 5 interacts with the mannikin sensors is described below. The probe also includes a two-position switch 8 for selecting ultrasound mode or Doppler mode. A cable 9 connects the probe 5 to the system unit and conveys signals including a signal indicating the setting of the switch 8.

The system unit 2 includes a mother board programmed to control the drive means of the mannikin and to process the signals from the sensors in order to establish their correspondence with the audiovisual signals to be transmitted to the monitor.

The system unit also includes one or more memory units of the video disk or CD-I type on which are stored sequences corresponding to given physiological or physiopathological conditions. These sequences are recorded during real examinations of real patients and correspond to actual clinical cases. To each clinical case there corresponds a group of audiovisual data, each item of data in the group corresponding to a specific position and a specific orientation of the scanning probe.

The system unit controls the playback of the sequences that it has selected on the basis of its interpretation of data transmitted by the mannikin sensors.

The system unit is also provided with means (not shown) such as a keyboard to enable a user to select a clinical case that the apparatus is to simulate from a set of clinical cases held in memory.

Figure 2:
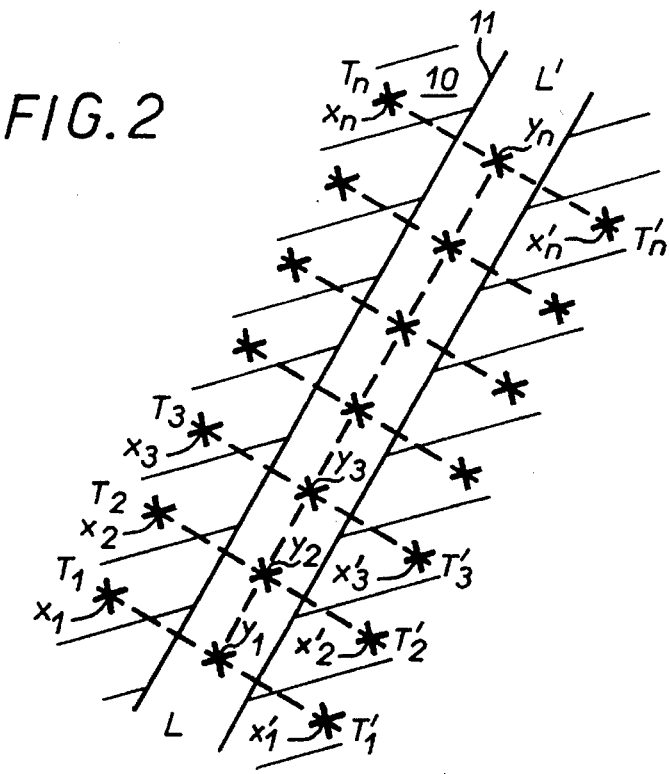
FIG. 2 is a view in cross-section showing the organization of the sensors in an array.

The disposition of the sensors under the outer layer of the mannikin is described next with reference to FIG. 2.

The aim is simulate an examination of the carotid arteries. These two arteries are situated one on each side of the neck. The sensors are judiciously disposed in the region of the neck of the mannikin in arrays extending along the supposed path of each of the two arteries. FIG. 2 shows diagrammatically an array of sensors 10 (indicated by crosses) along the path of an imaginary artery 11, the chain-dotted lines representing connections between the sensors.

This array firstly includes, along a longitudinal alignment L-L', a series of sensors vertically aligned with the path of the main axis of the artery. The array further includes a succession of transverse groups $T_1$-$T'_1$, $T_2$-$T'_2$, . . . , $T_n T'_n$ each comprising two sensors, for example the sensors $x_1$, $x'_1$, situated one on each side of a sensor, for example the sensor $Y_1$, in a longitudinal alignment L-L'. The y sensors are advantageously disposed at a different depth than the x sensors.

To obtain a signal in ultrasound scanning the probe must be vertically aligned with any of the alignments T-T' in order to excite a pair of sensors xx'. Each pair of sensors xx' can be associated with a y sensor.

In this case the actual activation of a group such as the group $x_1$-$x'_1$ can be made subordinate to that of a corresponding y sensor such as the sensor $Y_1$, which entails orienting the probe perpendicularly to the surface of the mannikin (for example).

In this embodiment the probe has a single elongate magnet adapted to activate three sensors disposed in a line. The probe can instead be provided with a plurality of magnets spaced in the same way as the sensors to be activated. Only three associated sensors (as shown by the dashed lines) stimulated by the probe can deliver a signal through the cable 7 which can be interpreted by the system unit 2 as being associated with an audiovisual sequence. Stimulation of three sensors which are not interconnected does not generate any signal on the monitor.

Figure 3:
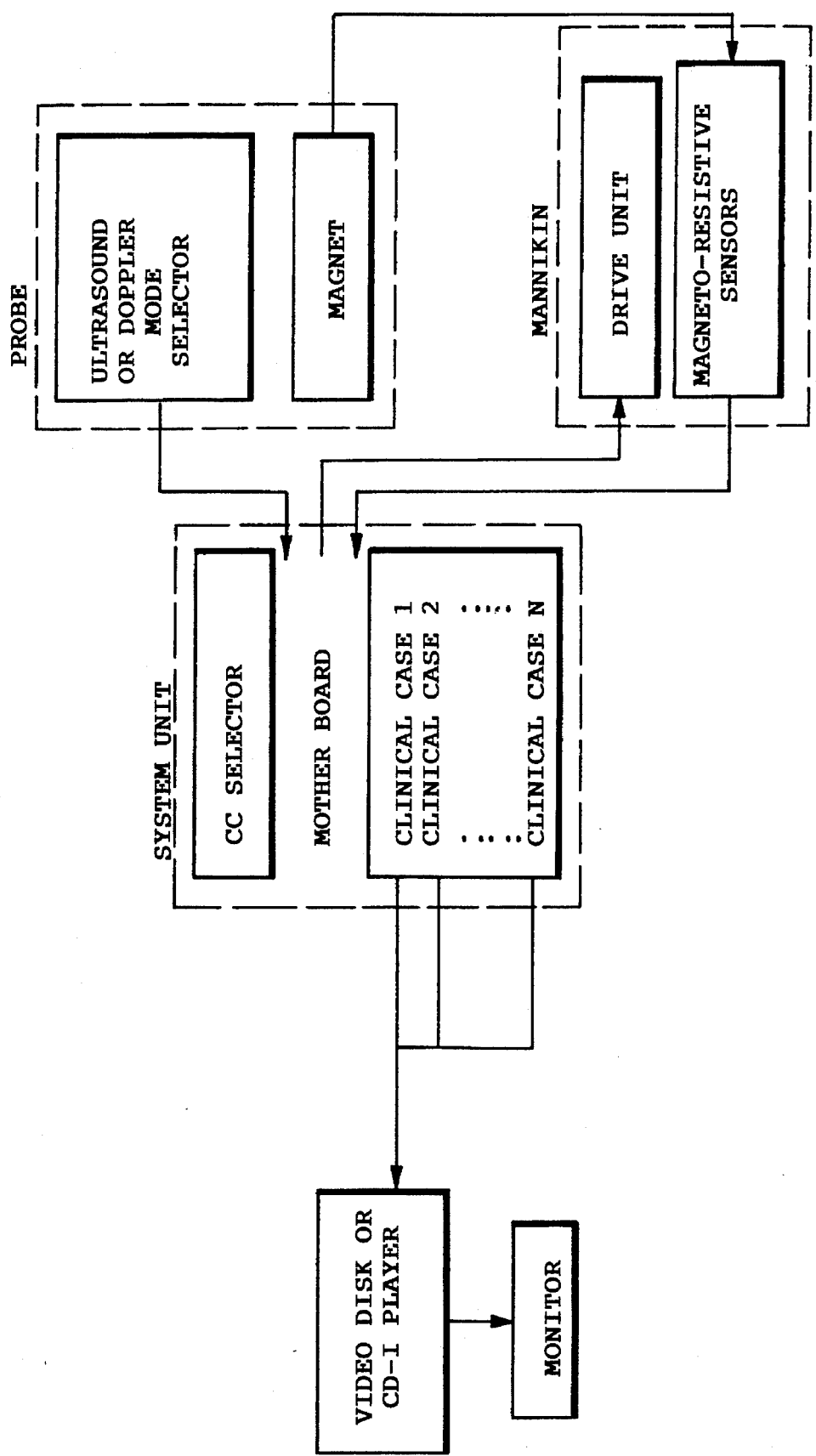
FIG. 3 is block diagram of the apparatus of the invention.

The operation of the apparatus is described next with reference to FIG. 3.

When the apparatus is switched on the system unit prompts the user to choose one of several physiological or physiopathological clinical cases. The user selects one of these. Another option is for the system unit to select a clinical case at random.

The system unit switches on the drive means which simulate the pulsing of the arteries.

The user selects either ultrasound mode or Doppler mode and moves the probe over the neck of the mannikin, for example along the path of the artery. When the magnet in the probe encounters three interconnected sensors, and if it is correctly positioned according to the elevation angle, if any, defined by the array of sensors, then the sensors of a group are stimulated and a signal is transmitted to the system unit which determines the associated audiovisual sequence as appropriate to the clinical case and the mode selected beforehand. The system unit then commands display of the signals on the monitor. The user can change mode at any time. If he switches from ultrasound mode to Doppler mode, for example, he must locate and track the longitudinal alignment L-L' corresponding to the path of the artery, each correct position activating a group of at least two y sensors.

Because a computer is used to centralize and manage the data the response time is very short and the images are virtually synchronized to placing of the probe.

The invention is naturally not limited to the details of the embodiment just described by way of example. It can also be used to scan the most diverse deep organs: heart, liver, spleen, bladder, prostate, uterus, etc. In the case of endoscopic, abdominal or joint examination, for example, the display of various organs can be simulated according to the orientation of the probe in azimuth and in elevation. In an application of this kind the probe simulating an endoscope could be mechanically associated with a universal joint adapted to cooperate with sensors giving the orientation in azimuth and in elevation of the probe.

I claim:

1. Apparatus for simulation of a non-invasive medical examination of organs, comprising: a mannikin (1) representing at least part of a human body, said mannikin (1) including a plurality of sensors; signal generator means (4) for generating signals representative of a given physiological or physiopathological condition; a system unit (2) controlling said signal generator means (4) in response to activation of said sensors; scanning means (5) for scanning said mannikin, said scanning means for controlling operation of said signal generator means (4), characterized in that said scanning means (15) is a probe having an alignment plane; said sensors are arranged in a plurality of groups, each group includes at least two of said sensors located on a respective common line, and a group of sensors is activated by said probe when the alignment plane of the probe contains a respective common line of that group.

2. Apparatus according to claim 1 wherein said sensors are arranged in a plane.

3. Apparatus according to claim 2 characterized in that each group of at least two sensors is associated with a set of signals representative of the physiological or physiopathological condition.

4. Apparatus according to claim 2 characterized in that the probe (5) includes at least one magnet adapted to stimulate at least two sensors in a plane passing through an axis defined by the two sensors.

5. Apparatus according to claim 4 wherein each said group of sensors is associated with a set of signals representative of the physiological or physiopathological condition.

6. Apparatus according to claim 5 characterized in that the signals representative of the physiological or physiopathological condition comprise audiovisual data stored in memory means and corresponding, for a given condition, to each possible position of the probe (5) on the mannikin (1).

7. Apparatus according to claim 6 characterized in that the memory means comprise at least one videodisk or CD-I player.

8. Apparatus according to claim 6 wherein said signal generator means comprise a TV monitor and said system unit is operative to receive signals from sensors which are activated by said probe and to control reproduction of audiovisual data from the memory means on said TV monitor.

9. Apparatus according to claim 8 characterized in that the memory means comprise at least one videodisk or CD-I player.

10. Apparatus according to claim 1 wherein said probe comprises a magnet for activating at least two of said sensors when said alignment plane intersects the two sensors.

11. Apparatus according to claim 10 characterized in that each group of at least two sensors is associated with a set of signals representative of the physiological or physiopathological condition.

12. Apparatus according to claim 1 characterized in that the sensors are of the magnetoresistive type.

13. Apparatus according to claim 1 characterized in that the probe (5) includes a switch (8) for selecting either of two modes and in that a cable (9) connecting the probe (5) to the system unit (2) is used to transmit a signal representative of which mode is chosen.

14. Apparatus according to claim 1 characterized in that it includes manual means for selecting in the system unit a physiological or physiopathological condition to be simulated.

15. Apparatus according to claim 1 characterized by the association with a scanning area of the mannikin of an array of two sets of sensors disposed at different depths under the skin of the mannikin.

16. Apparatus according to claim 1 wherein at least one of said groups of sensors includes two of said sensors located on the respective common line and a third one of said sensors disposed at a location spaced from the common line so that the two of said sensors and said third one of said sensors lie in a common plane, and said sensors of said at least one said group are activated only when said probe is oriented so that the alignment plane coincides with the common plane.

* * * * *